United States Patent [19]

Rohringer et al.

[11] Patent Number: 5,976,410
[45] Date of Patent: Nov. 2, 1999

[54] DISPERSIONS OF FLUORESCENT WHITENING AGENTS

[75] Inventors: Peter Rohringer, Schönenbuch; Rainer Hans Traber, Reinach, both of Switzerland; Peter Ruf, Mölndal, Sweden; Thomas Engelhardt, Rheinfelden, Germany; Karla Ann Wilzer, Greensboro, N.C.

[73] Assignee: Ciba Specialty Chemicals Corporation, Tarrytown, N.Y.

[21] Appl. No.: 08/946,091

[22] Filed: Oct. 7, 1997

[30] Foreign Application Priority Data

Oct. 10, 1996 [CH] Switzerland .............................. 2473/96

[51] Int. Cl.⁶ .................................................. C09K 11/06
[52] U.S. Cl. ............................... 252/301.21; 252/301.23; 252/201.32; 162/72; 162/76; 106/287.3; 106/499; 106/503

[58] Field of Search ......................... 252/301.23, 301.34, 252/301.21; 162/72, 76; 106/287.3, 499, 503

[56] References Cited

U.S. PATENT DOCUMENTS

| | | | |
|---|---|---|---|
| 4,024,071 | 5/1977 | Fringeli | 252/301.23 |
| 5,076,968 | 12/1991 | Fringeli et al. | 252/301.23 |
| 5,429,767 | 7/1995 | Zelger | 252/301.23 |
| 5,518,657 | 5/1996 | Fringeli et al. | 252/201.23 |

*Primary Examiner*—C. Melissa Koslow
*Attorney, Agent, or Firm*—Kevin T. Mansfield

[57] ABSTRACT

Disclosed are dispersions of fluorescent whitening agents which are suitable for the fluorescent whitening of coating compositions for coating paper or of fibre dispersions (paper pulps) in paper production.

19 Claims, No Drawings

DISPERSIONS OF FLUORESCENT WHITENING AGENTS

The present invention relates to novel dispersions of fluorescent whitening agents, to their use in paper pulps and also coating compositions, for example for coating paper, as well as to coating compositions comprising these dispersions.

Fluorescent whitening agents for use in the paper industry are usually marketed, in the form of solutions which generally comprise the sodium salt of the whitener and substantial amounts of a solubiliser, such as urea, or a solvent, such as a polyalkylene glycol, for the fluorescent whitening agent to be dissolved completely. To ensure that the commercial product remains stable even at low temperatures, a concentration of about 22% could not be exceeded to date if the solubiliser content was to remain in an acceptable ratio to the amount of whitener. As, after application, these solubilisers are undesirable in the waste water, there was a need for a formulation containing no such substances or only minor amounts thereof.

It has now been found that it is possible to prepare stable aqueous dispersions from the fluorescent whitening agents of formula (1) given below if the whiteners are present in the form of the free acid and if the dispersions comprise a polyhydroxyl compound. Surprisingly, such dispersions are storage-stable over a prolonged period of time and, when used in paper coating compositions, dissolve quickly enough in the presence of even small amounts of alkali so as to ensure perfect distribution when applied in the pulp as well as when being incorporated in paper coating compounds for surface application in coating.

Surprisingly, it is possible to forego the addition of alkali completely when using fillers such as precipitated or natural calcium carbonate.

The dispersions of this invention do not contain any dispersants which is an important economical advantage.

This invention relates to dispersions of fluorescent whitening agents, which comprise a) 5 to 60% by weight of a fluorescent whitening agent of formula

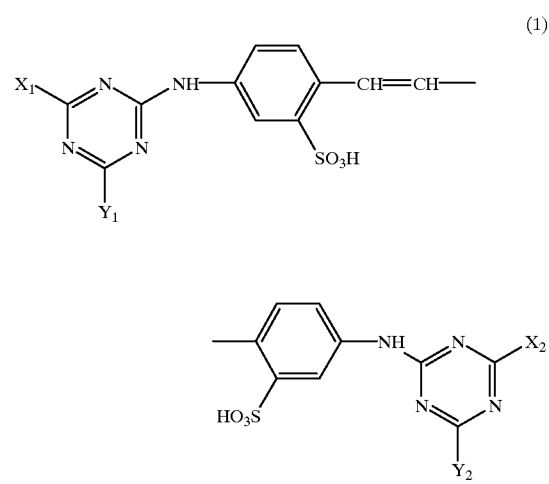

in the form of the free acid, wherein $X_1$, $X_2$, $Y_1$ and $Y_2$ are each independently of one another a $NH_2$ group or a primary or secondary amine radical or an unbranched or branched alkoxy group or a phenoxy group, b) 0.01 to 3% by weight of a polyhydroxyl compound, c) water and, optionally, d) further additives.

The dispersions preferably contain less than 2% by weight, more preferably less than 0.8% by weight, of electrolyte.

The dispersions preferably contain 10 to 50% by weight, more preferably 20 to 50% by weight, most preferably 30 to 45% by weight, of whitener, based on the total weight of the dispersion.

Preferred dispersions are those, which comprise a whitener of formula

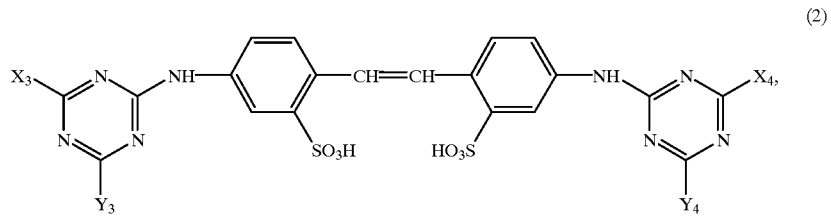

wherein $X_3$, $X_4$, $Y_3$ and $Y_4$ are each independently of one another a phenylamino group which may be mono- or disubstituted by $C_1$–$C_2$alkyl, a morpholino group, a mono-$C_{1-C_4}$-alkylamino or di-$C_{1-C_4}$alkylamino group which may be substituted by one or more than one hydroxyl radical, or a $C_1$–$C_4$alkoxy group.

Very particularly interesting dispersions are those comprising a fluorescent whitening agent of formula

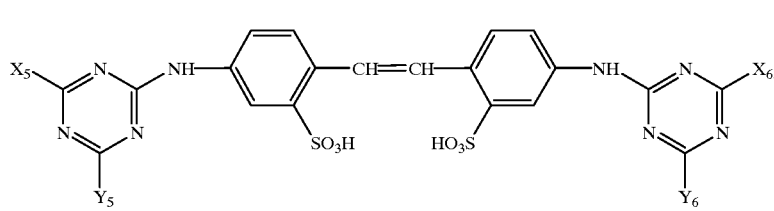

(3)

wherein $X_5$ and $X_6$ are each independently of the other a phenylamino group which may be mono- or disubstituted by $C_{1-C_2}$alkyl, and $Y_5$ and $Y_6$ are a morpholino group, or a di-$C_{1-C_4}$-alkylamino group which may be substituted by one or more than one hydroxyl radical.

Of these dispersions those are particularly preferred, wherein $Y_5$ and $Y_6$ are a di-$C_1$–$C_4$alkylamino group which may be substituted by one or more than one hydroxyl radical.

The novel dispersions preferably comprise more than 25% by weight of whitener and less than 0.8% by weight of electrolyte, based on the total weight of the dispersion. In this connection, electrolytes are to be understood as being low-molecular inorganic salts which are obtained as side-products from the synthesis or from the chemicals or solvents used, e.g. water. These electrolytes are, in particular, alkali halides, alkali sulfates or alkali hydrogen sulfates.

The fluorescent whitening agents of formula (1) are known or can be prepared in a manner known per se. If the whiteners contain more than the desired amount of electrolyte after the synthesis then this excess must be removed. This can be effected by conventional methods. In most cases it suffices to wash the filter cake with demineralised water.

Suitable polyhydroxyl compounds are, for example, the customary thickeners. These are organic natural thickeners, organical modified natural substances, organic synthetic thickeners, such as polyvinyl alcohol, or inorganic thickeners, such as montmorillonite or hectorite.

The novel dispersions preferably contain as polyhydroxyl compound an anionic modified polysaccharide which is derived from cellulose, starch or heteropolysaccharides and which may contain in the side chains further monosaccharides, such as mannose and glucuronic acid. Typical examples of suitable anionic polyhydroxyl compounds are sodium alginate, carboxymethylated guar, carboxymethyl cellulose, carboxyethyl cellulose, carboxymethyl starch, carboxymethylated carob bean flour and, in particular, xanthane. It is of course also possible to use mixtures comprising two or several polyhydroxyl compounds.

The amount of polyhydroxyl compound in the novel dispersions is from 0.01 to 3% by weight, based on the weight of the dispersion. A preferred range is from 0.05 to 0.5% by weight being preferred and a particularly preferred range is from 0.1 to 0.3% by weight.

If desired, the novel dispersions may contain further additives, typically preservatives, e.g. 1,2-benzisothiazolin-3-one or aldehydes, such as formaldehyde or acetaldehyde, antifreezing agents or antifoams.

The novel dispersions are obtained, for example, by thoroughly mixing the moist filter cake or also the dry powder of a fluorescent whitening agent of formula (1) with water and, if appropriate, reducing the particle size by wet milling to less than 20 $\mu$m, preferably to less than 10 $\mu$m. A polyhydroxyl compound and further optional additives are then added and mixed until the components are homogeneously distributed.

The dispersions so obtained are storage-stable for a prolonged period of time, for example for 6 months, even at temperatures in the range from about 0° C. up to 400° C.

The novel dispersions are suitable for whitening paper pulps used for the production of paper, typically cellulose, wood pulp (chemical and mechanical pulp) and for whitening the coating compositions customarily employed in the paper industry for whitening unpigmented and, in particular pigmented, paper pulps and coating compositions.

The known coating compositions comprise as binder, inter alia, plastics dispersions based on copolymers of butadiene/styrene, acrylonitrile/butadiene/styrene, acrylates, ethylene/vinyl chloride or ethylene/vinyl acetate or based on homopolymers, typically polyvinyl chloride, polyvinylidene chloride, polyethylene, polyvinyl acetate or polyurethanes. A preferred binder consists of styrene/butyl acrylate mixed polymers or styrene/butadiene/arylic acid mixed polymers. Other polymer latices are described, inter alia, in U.S. Pat. Nos. 3,265,654, 3,657,174, 3,547,899 and 3,240,740.

To pigment the coating compounds it is usual to use aluminium silicates, such as china clay and kaolin, and also barium sulfate, satin white, titanium dioxide or calcium carbonate (chalk).

Formulations of such known coating compounds for paper are described, inter alia, in J. P. Casey "Pulp and Paper", Chemistry and Chemical Technology, 2. Ed. Vol. III, p. 1648–1649 and in Mc Graw-Hill "Pulp and Paper Manufacture", 2. and 5. Ed. Vol. III, p. 497.

The inventive coating compositions preferably comprise 5 to 70% by weight of a white pigment. The binder is preferably used in an amount which is sufficient to produce a dry content of polymeric compound of 1 to 30% by weight, preferably of 5 to 25% by weight, of the white pigment. The amount of the novel whitener dispersion is calculated such that the whitener is present in an amount of 0.005 to 1% by weight, preferably of 0.01 to 0.55% by weight, based on white pigment.

The inventive coating compositions can be prepared by mixing the components in any sequence at a temperature in the range from 10 to 100° C., preferably from 20 to 80° C. The components include also the customary assistants which can be used to regulate the rheological properties, such as the viscosity or water retention value of the coating compounds. Such assistants are, for example, natural binders, such as starch, casein, protein or gelatin, cellulose ethers, such as carboxyalkyl cellulose or hydroxyalkyl cellulose, alginic acid, alginates, polyethylene oxide or polyethylene oxide alkyl ether, mixed polymers of ethylene oxide and propylene oxide, polyvinyl alcohol, polyvinyl pyrrolidone, water-soluble condensates of formaldehyde with urea or melamine, polyphosphates or polyacrylic acid salts.

The inventive dispersions are incorporated either into the ready coating composition or into one of the components of the coating composition.

The inventive coating compositions can be used for coating paper, wood and films, such as cellulose, cellulose triacetate, textile materials and the like. The application on paper and cardboard and also on photographic papers is particularly preferred.

The coating compositions can be applied to the substrate by any conventional process, for example using an air jet, a doctor knife, brush, roll, coating knife or rod, whereupon the coating is dried using e.g. an infrared dryer and/or a hot air dryer at a temperature on the surface of the substrate in the range from 70 to 200° C., preferably from 90 to 130° C., to a residual moisture of 3 to 6% by weight.

The use of the inventive whitener dispersions results in the coatings being distinguished by optimum distribution of the fluorescent whitening agent over the entire surface and by the resultant increase of the whiteness as well as by high fastness to light.

When applying the inventive whitener dispersions, an alkaline pH is advantageous in order to perfectly dissolve the fluorescent whitening agent. In coating compounds, this pH should preferably be in the range from 8 to 11 and in the pulp preferably from 7.5 to 9. The desired alkaline pH can be adjusted e.g. by addition of NaOH, this pH preferably being adjusted in the fibre dispersion or in the coating compound already before adding the whitener dispersion. When using alkaline fillers, such as precipitated or natural calcium carbonate, it is possible to forego the addition of alkali.

Accordingly, this invention also relates to the use of the inventive dispersion for the fluorescent whitening of coating compounds for coating paper and hence also to the use of the novel dispersions for the fluorescent whitening of fibre dispersions in the production of paper.

EXAMPLE 1

3333 parts of moist filter cake, having an electrolyte content of less than 0.3% and comprising 1733 parts of water and 1600 parts of the fluorescent whitening agent of formula

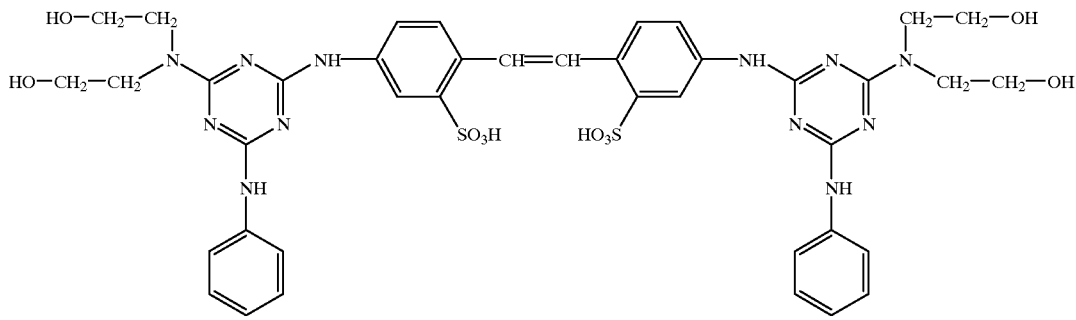

in the form of the free acid, are charged, with vigorous stirring, with 312 parts of deionised water and the mixture is stirred until the slurry is homogeneously distributed. Subsequently, 355 parts of an aqueous solution, comprising 1.5 parts per hundred parts of xanthane and 2.3 parts per hundered parts of a preservative (aqueous solution of 1,2-benzisothiazolin-3-one) are added and stirring is continued for another 50 minutes until the components are homogeneously distributed.

A dispersion is obtained which does not show any sedimentations even after storing for several weeks at 25° C.

EXAMPLE 2

A fibre suspension, consisting of 5 parts of fibres (1:1 mixture of birch/pine kraft pulp; degree of beating 35°S.R.) in 200 parts of water of a hardness of 25 ppm CaO is charged with 10% of precipitated calcium carbonate, based on the fibre material. Subsequently, 0.0275 part of the whitener dispersion obtained according to Example 1 is added and the mixture is stirred slowly for 1 minute, adding 0.03% of a solution of a commercial cationic retention aid (modified polyacrylamide), based on the total weight of fibre and pigment. Paper sheets are then produced on a sheet former (system Rapid-Köthen). The moist paper sheets are pressed and dried between two sheets of filter paper for 20 minutes at 110° C.

Paper sheets are obtained which have an equally good fluorescence and whitener action as paper sheets produced with commercial formulations of the same whitener in the form of a solution containing urea.

EXAMPLE 3

The procedure of Example 2 is repeated, but replacing precipitated calcium carbonate with the same amount of natural calcium carbonate.

Paper sheets are obtained which have an equally good fluorescence and whitener action as paper sheets obtained according to Example 2.

EXAMPLE 4

The procedure of Example 2 is repeated, but adding 1.6 parts of 0.1 n NaOH after adding the whitener dispersion. Processing is then carried out as described in Example 2.

Paper sheets are obtained which have an equally good fluorescence and whitener action as paper sheets obtained according to Example 2.

EXAMPLE 5

The procedure of Example 3 is repeated, but adding 1.6 parts of 0.1 n NaOH after adding the whitener dispersion. Processing is then carried out as described in Example 2.

Paper sheets are obtained which have an equally good fluorescence and whitener action as paper sheets obtained according to Example 2.

EXAMPLE 6

100 Parts of natural calcium carbonate, 18 parts of a 50% styrene/butadiene/latex dispersion, 1 part of polyvinyl alcohol, 0.25 part of a synthetic thickener and 45 parts of water are stirred until a homogeneous distribution is obtained, adding such an amount of NaOH as to give a pH of 9.5.

0.55 Part of the dispersion prepared according to Example 1 is added to this pulp and stirring is continued for another 5 minutes at room temperature.

A wood-free paper which does not yet contain any fluorescent whitening agent (90 g/m², Cobb30=12 g/m², ISO whiteness 82.4%) is coated with the coating composition so obtained on a laboratory coating machine. The weight of the top coat after conditioning at 23° C. and 50% relative humidity is 9 g/m². The paper is dried in an infrared dryer and then in a hot air dryer to a residual moisture of 7%.

Paper is obtained which has an equally good fluorescence and whitener action as paper produced with commercially available formulations of the same whitener in the form of a solution containing urea.

EXAMPLE 7

The procedure of Example 1 is repeated, but using the whitener of formula

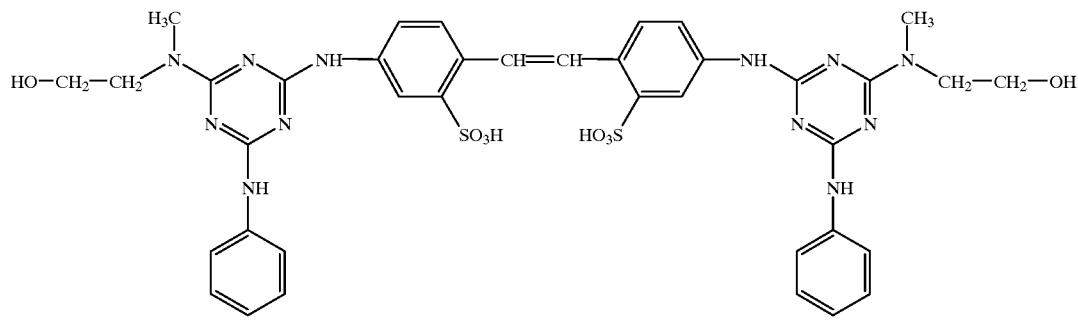

in the form of the free acid, which also gives a dispersion which does not show any sedimentations even after storing for several weeks at 25° C.

EXAMPLE 8

The procedure of Example 1 is repeated, but using the whitener of formula

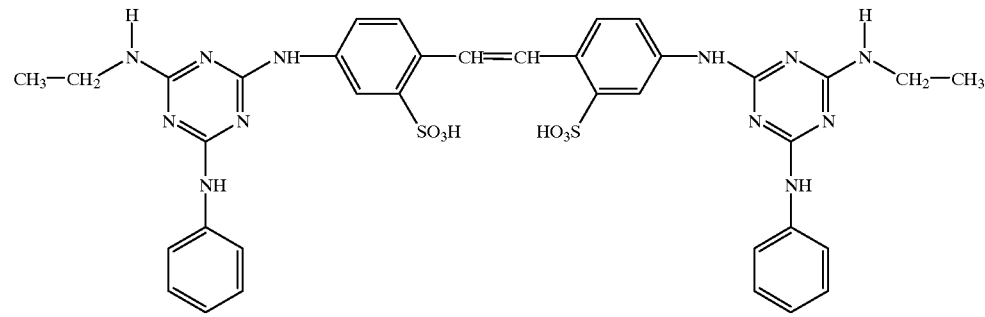

in the form of the free acid, which also gives a dispersion which does not show any sedimentations even after storing for several weeks at 25° C.

EXAMPLE 9

The procedure of Example 1 is repeated, but using the whitener of formula

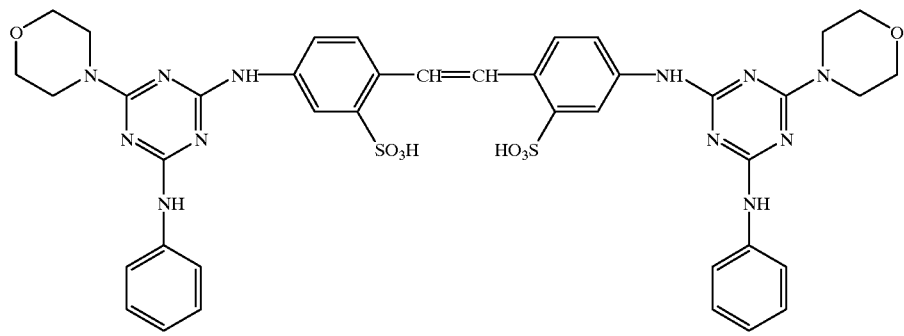

in the form of the free acid, which also gives a dispersion which does not show any sedimentations even after storing for several weeks at 25° C.

What is claimed is:

1. A dispersion of a fluorescent whitening agent, which comprises a) 5 to 60% by weight of a fluorescent whitening agent of formula

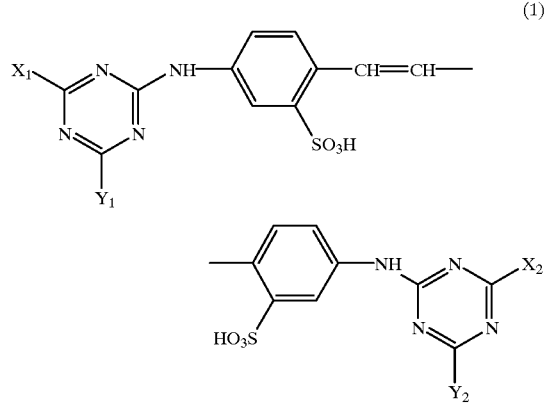

(1)

in the form of the free acid, wherein $X_1$, $X_2$, $Y_1$ and $Y_2$ are each independently of one another a $NH_2$ group or a primary or secondary amine radical or an unbranched or branched alkoxy group or a phenoxy group, b) 0.01 to 3% by weight of a polyhydroxyl compound, c) water and, optionally, d) a preservative, an antifreezing agent or an antifoam, with the proviso that said dispersion comprises less than 2% by weight of electrolyte, based on the total weight of the dispersion and is free of despesments.

2. A dispersion according to claim 1, which comprises less than 0.8% by weight of electrolyte, based on the total weight of the dispersion.

3. A dispersion according to claim 1, which comprises 10 to 50% by weight of fluorescent whitening agent, based on the total weight of the dispersion.

4. A dispersion according to claim 3, which comprises 20 to 50% by weight of fluorescent whitening agent, based on the total weight of the dispersion.

5. A dispersion according to claim 4, which comprises 30 to 45% by weight of fluorescent whitening agent, based on the total weight of the dispersion.

6. A dispersion according to claim 1, which comprises a whitener of formula

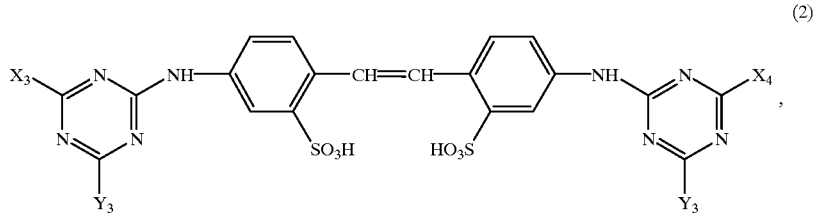

(2)

wherein $X_3$, $X_4$, $Y_3$ and $Y_4$ are each independently of one another a phenylamino group which may be mono- or disubstituted by $C_1$–$C_2$alkyl, a morpholino group, a mono-$C_1$–$C_4$alkylamino or di-$C_1$–$C_4$alkylamino group which may be substituted by one or more than one hydroxyl radical, or a $C_1$–$C_4$alkoxy group.

7. A dispersion according to claim 1, which comprises a fluorescent whitening agent of formula

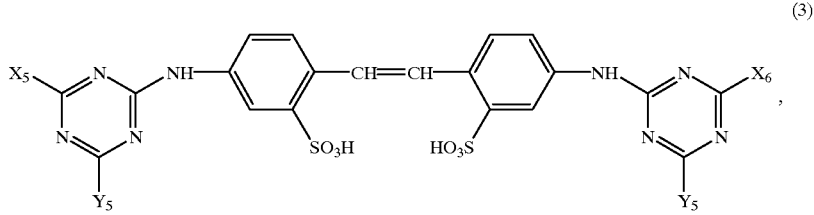

(3)

wherein $X_5$ and $X_6$ are each independently of the other a phenylamino group which may be mono- or disubstituted by $C_1$–$C_2$alkyl, and $Y_5$ and $Y_6$ are a morpholino group or a di-$C_1$–$C_4$-alkylamino group which may be substituted by one or more than one hydroxyl radical.

8. A dispersion according to claim 7, which comprises a fluorescent whitening agent of formula (3), wherein $Y_5$ and $Y_6$ are a di-$C_1$–$C_4$alkylamino group which may be substituted by one or more than one hydroxyl radical.

9. A dispersion according to claim 1, which comprises more than 25% by weight of fluorescent whitening agent and less than 0.8% by weight of electrolyte.

10. A dispersion according to claim 1, wherein the polyhydroxyl compound is an anionic modified polysaccharide which is derived from cellulose, starch or heteropolysaccharides and which may contain in the side chains as further monosaccharides mannose and glucuronic acid.

11. A dispersion according to claim 1, wherein the polyhydroxyl compound is an inorganic thickener or a mixture of an inorganic and an organic thickener.

12. A dispersion according to claim 11, wherein the inorganic thickener is hectorite or montmorillonite.

13. A dispersion according to claim 1, wherein the polyhydroxyl compound is sodium alginate, carboxymethylated guar, carboxymethyl cellulose, carboxyethyl cellulose, carboxymethyl starch, carboxymethylated carob bean flour or xanthane.

14. A dispersion according to claim 13, wherein the polyhydroxyl compound is xanthane.

15. A dispersion according to claim 1, wherein the polyhydroxyl compound is present in an amount of 0.05 to 0.5% by weight, based on the weight of the dispersion.

16. A dispersion according to claim 15, wherein the polyhydroxyl compound is present in an amount of 0.1 to 0.3% by weight, based on the weight of the dispersion.

17. A dispersion according to claim 15, wherein the polyhydroxyl compound is present in an amount of 0.05 to 0.2% by weight, based on the weight of the dispersion.

18. A method for the fluorescent whitening of paper or cardboard, which comprises coating a composition comprising an effective whitening amount of a dispersion of a fluorescent whitening agent according to claim 1 onto the paper or cardboard.

19. A method for the fluorescent whitening of a dispersion of paper pulp fibres during paper production, which comprises incorporating into the paper pulp fiber dispersion an effective whitening amount of a dispersion of a fluorescent whitening agent according to claim 1.

* * * * *